United States Patent
Barnes et al.

(10) Patent No.: US 9,945,509 B2
(45) Date of Patent: Apr. 17, 2018

(54) QUICK-RELEASE MOUNTING SYSTEM FOR REMOVABLY ATTACHING A PANEL INSTRUMENT TO A STRUCTURE

(71) Applicant: PANASONIC AVIONICS CORPORATION, Lake Forest, CA (US)

(72) Inventors: Andrew Barnes, Mission Viejo, CA (US); Rudy Concepcion, Jr., Rancho Santa Margarita, CA (US)

(73) Assignee: PANASONIC AVIONICS CORPORATION, Lake Forest, CA (US)

( * ) Notice: Subject to any disclaimer, the term of this patent is extended or adjusted under 35 U.S.C. 154(b) by 51 days.

(21) Appl. No.: 15/226,095

(22) Filed: Aug. 2, 2016

(65) Prior Publication Data
US 2018/0038543 A1  Feb. 8, 2018

(51) Int. Cl.
| | |
|---|---|
| *G12B 9/00* | (2006.01) |
| *F16M 11/04* | (2006.01) |
| *B60R 11/02* | (2006.01) |
| *F16M 13/02* | (2006.01) |
| *B60R 11/00* | (2006.01) |

(52) U.S. Cl.
CPC ....... *F16M 11/041* (2013.01); *B60R 11/0235* (2013.01); *F16M 13/02* (2013.01); *B60R 2011/0015* (2013.01); *B60R 2011/0052* (2013.01); *B60R 2011/0078* (2013.01)

(58) Field of Classification Search
USPC ....................................................... 248/27.1
See application file for complete search history.

(56) References Cited

U.S. PATENT DOCUMENTS

| 7,364,230 B2* | 4/2008 | Zheng ................. B60R 11/0235 297/188.2 |
| 8,967,566 B2* | 3/2015 | McClain .............. F16M 11/041 248/229.12 |
| 9,360,895 B2* | 6/2016 | Shah ................ B64D 11/00151 |

(Continued)

FOREIGN PATENT DOCUMENTS

CN          104486920 A       4/2015

OTHER PUBLICATIONS

U.S. Appl. No. 15/164,768, filed May 25, 2016, entitled: Quick-Release Mounting System for Removably Attaching a Panel Instrument to a Structure, Inventor: Feng Jiang (46pages).

*Primary Examiner* — Monica E Millner
(74) *Attorney, Agent, or Firm* — Vista IP Law Group LLP

(57) ABSTRACT

A quick-release mounting apparatus for mounting a panel instrument to a mounting surface or support. The mounting apparatus comprises a frame to be mounted to the mounting support. A slide bar is slidably mounted to the frame and is slidable between a locked position and an unlocked position. The slide bar has a mounting hole configured to receive a mounting pin projecting from the back surface of the panel instrument. The mounting hole locks the mounting pin within the mounting hole in the locked position and allows the mounting pin to be removed from the mounting hole in the unlocked position. A cam is rotatably mounted to the frame and couples the slide bar to an actuator configured to rotate the cam between a locking position and an unlocking position. The actuator has a biasing device which biases the cam toward the locking position.

20 Claims, 4 Drawing Sheets

(56) References Cited

U.S. PATENT DOCUMENTS

| | | | |
|---|---|---|---|
| 9,469,253 B2* | 10/2016 | Brunard | B60R 11/02 |
| 9,586,532 B1* | 3/2017 | Gough | B60R 11/0235 |
| 9,695,972 B1* | 7/2017 | Jiang | F16M 11/041 |
| 2001/0011664 A1 | 8/2001 | Meritt | |
| 2007/0290536 A1* | 12/2007 | Nathan | B60K 35/00 |
| | | | 297/217.3 |
| 2009/0250582 A1* | 10/2009 | Ziaylek | A62B 25/00 |
| | | | 248/312 |
| 2009/0316057 A1 | 12/2009 | Campbell et al. | |
| 2011/0315840 A1* | 12/2011 | Connolly | F16M 11/041 |
| | | | 248/220.31 |
| 2012/0018471 A1 | 1/2012 | Guillermo et al. | |
| 2012/0063081 A1 | 3/2012 | Grunwald | |
| 2012/0120626 A1* | 5/2012 | Akaike | B60R 11/02 |
| | | | 361/807 |
| 2013/0147847 A1* | 6/2013 | Koseki | B60R 11/0235 |
| | | | 345/660 |
| 2014/0198473 A1 | 7/2014 | Shah et al. | |

* cited by examiner

QUICK-RELEASE MOUNTING SYSTEM FOR REMOVABLY ATTACHING A PANEL INSTRUMENT TO A STRUCTURE

BACKGROUND

The field of the invention generally relates to mounting a panel instrument, such as a video monitor, terminal, or other panel instruments, to a mounting surface or support, such as the back of an airline passenger seat, and more particularly, to a quick-release mounting system for securely and conveniently mounting a panel instrument to a mounting surface or support.

Vehicle passenger seats, such as passenger seats in aircraft, trains, automobiles, etc., often serve as mounting locations for video monitors and other panel mounted instruments, such as control panels, terminals, and other devices sometimes referred to as line replaceable units ("LRUs"). Such devices are referred to herein as "panel instruments." For example, vehicle entertainment systems for various types of vehicles may have video displays installed at each passenger seat, such as mounted in the seatbacks of the passenger seats, and/or on cabin walls, i.e., in the first row of a section.

Typical methods for mounting panel instruments, such as video monitors, on mounting surfaces such as seatbacks, cabin walls and other suitable mounting surface or support, include attaching brackets, bezels, and/or covers for the video display to the mounting surface/support using screws extending through the mounting surface to the back surface of the panel instrument. In the case of a video monitor mounted to the back of a passenger seatback, the heads of the screws are located under the upholstery of the seat. Accordingly, the upholstery must be removed in order to access the screws in order to install or remove a video monitor, which is very time consuming.

SUMMARY

In one embodiment, the present invention is directed to an innovative quick-attach, quick-release, mounting system for mounting a panel instrument, such as a video monitor, to a mounting surface or support, such as a passenger seatback or other structure, which allows the video monitor to be quickly and easily installed and removed by accessing the locking mechanism from the front of the panel instrument. The mounting system also safely and securely locks the panel instrument in place to prevent theft or unauthorized tampering of the panel instrument. For instance, the actuator for the locking mechanism of the mounting system may be concealed and/or include a custom tool interface such that a specialized tool is required to actuate the locking mechanism. The mounting system includes a mounting apparatus configured to be mounted to a mounting support, and a mating mounting apparatus configured to be disposed on the panel instrument. In one particularly innovative aspect, the mounting system allows the panel instrument to simply be pushed into place in which the apparatuses automatically mate and lock together without using any tools, or requiring any further adjustment or manipulation by a user. The mounting system may be utilized to mount any panel instrument, such as a video monitor, terminal, LRU, etc., to any suitable mounting surface or support, such as a vehicle seatback in aircraft, trains, automobiles, etc.

Accordingly, in one embodiment of the present invention, a first mounting apparatus is provided for mounting a panel instrument, in which the panel instrument has a back surface. The first mounting apparatus includes a first frame configured to be mounted to the back surface of the panel instrument. For example, the first frame may have flanges with fastener holes for inserting fasteners and fastening the fasteners to the panel instrument. The first frame includes a plurality of mounting pins projecting therefrom. When the first frame is mounted to the back surface of the panel instrument, the mounting pins project therefrom.

The combination of the first mounting apparatus and second mounting apparatus represents one embodiment of a mounting system described herein, with the second mounting apparatus configured to be mounted to the mounting support. For example, the second mounting apparatus may include a frame having flanges with fastener holes for inserting fasteners and fastening the fasteners to the mounting support. In another embodiment, the panel instrument may be formed with pins already projecting therefrom, such that only one mounting apparatus is used, i.e., the second mounting apparatus in this situation.

In the embodiment with first and second mounting apparatuses, the second mounting apparatus includes a second frame and a slide bar slidably mounted to the second frame such that the slide bar is slidable between a locked position in which the second mounting apparatus is locked to the first mounting apparatus, and an unlocked position which releases the second mounting apparatus from the first mounting apparatus. The slide bar has a mounting hole configured to receive a mounting pin of the plurality of mounting pins projecting from the first frame in which the first mounting apparatus is attached to the back of the panel instrument. The mounting hole is configured to lock the mounting pin within the mounting hole when the slide bar is in the locked position and to allow the mounting pin to be removed from the mounting hole when the slide bar is in the unlocked position.

A cam is rotatably mounted to the second frame, such that the cam may be rotated relative to the second frame. The cam is rotatable in a first rotational direction to a locking position in which the slide bar is in the locked position and a second rotational direction opposite the first rotational direction to an unlocking position in which the slide bar is in the unlocked position. A link couples the slide bar to the cam such that rotation of the cam in the first rotational direction drives or forces the slide bar toward the locked position, and rotation of the cam in the second rotational direction drives or forces the first slide bar toward the unlocked position.

The second mounting apparatus also has an actuator coupled to the cam. The actuator is configured to rotate the cam between the locking position and the unlocking position. The actuator further includes a biasing device which biases the cam in the first rotational direction toward the locking position. Thus, the biasing device drives or forces the slide bar to its locked position.

In another aspect, the mounting pin and/or mounting hole are configured such that as the first mounting pin is inserted into the first mounting hole, the mounting pin moves the sliding bar toward the unlocked position, thereby allowing the mounting pin to be fully inserted into the mounting hole. For instance, the mounting pin may have a frusto-conical shape or other tapered shape that forces the slide bar laterally as it is inserted into the mounting hole. This feature allows the first mounting apparatus (and thus, the panel instrument) to be mounted to the second mounting apparatus merely by pushing the first mounting apparatus onto the second mounting apparatus without a user using any tools and without specifically actuating or adjusting any of the components of the mounting system.

In still another aspect, the actuator, has a tool interface for receiving a tool for manipulating the actuator to rotate the cam from the locking position to the unlocking position. For instance, the tool interface may be a tool interface, such as a special shape, for instance a Torx screw head, or special geometry hole other than a simple circular hole, for receiving a removal tool used to actuate the actuator.

In another aspect, the actuator may comprise a pull bar slidably mounted to the second frame, and a linkage coupling the pull bar to the cam. As the pull bar is translated, the pull moves the linkage which in turn rotates the cam.

In yet another aspect, the biasing device may comprise a biasing spring received on the pull bar. A first end of the biasing spring bears against a spring stop fixed to the frame and a second end of the biasing spring bears against a stop on the pull bar. In this way, the biasing spring biases the pull bar in a first direction that exerts a force on the linkage causing the linkage to bias the cam in the first rotational direction. The tool interface may be coupled to the pull bar such that manipulation of the tool interface translates the pull bar which in turn moves the linkage causing the linkage to rotate the cam.

In still another aspect, the mounting hole may include a locking edge configured to be received in a slot or groove of the mounting pin when the slide bar is in the locked position with the mounting pin inserted into the mounting hole to a locking depth. As the mounting pin is inserted into the mounting hole, the frusto-conical portion or tapered portion of the mounting pin pushes the slide bar toward the unlocked position allowing the mounting pin to be inserted into the mounting hole. When the mounting pin reaches a locking depth, the groove of the mounting pin is positioned adjacent the locking edge. The biasing device biases drives or forces the locking edge into the groove, thereby locking the mounting pin within the mounting hole such that it cannot be pulled out unless the slide bar is slid to the unlocked position. This effectively locks the first mounting apparatus mounted to the second mounting apparatus until the slide bar is moved to the unlocked position.

In another aspect, the slide bar may include one or more additional mounting holes spaced apart on the slide bar, such as a second mounting hole. Each of the additional mounting hole(s) are configured to receive a respective mounting pin having a groove. For instance, the second mounting hole is configured to lock a second mounting pin within the second mounting hole when the slide bar is in the locked position and to release the second mounting pin when the slide bar is in the unlocked position.

In still another aspect, the second mounting apparatus may include another slide bar, same or similar to the other slide bar, slidably mounted to the second frame and spaced apart from the other slide bar. The another slide bar has a mounting hole, same or similar to the mounting hole of the other slide bar and configured to receive another mounting pin. Like the other slide bar, the another slide bar is slidable between a locked position and an unlocked position. An another link couples the another slide bar to the cam such that rotation of the cam in the first rotational direction forces the another slide bar toward the locked position, and rotation of the cam in the second rotational direction forces the another slide bar toward the unlocked position. The cam may be positioned between the slide bars, such that rotation of the cam moves the slide bars in opposite directions.

In still another aspect, the mounting system may be configured such that the first mounting apparatus is configured to be mounted to the mounting support and the second mounting apparatus is configured to be mounted to the panel instrument.

BRIEF DESCRIPTION OF THE DRAWINGS

The foregoing and other aspects of embodiments are described in further detail with reference to the accompanying drawings, wherein like reference numerals refer to like elements and the description for like elements shall be applicable for all described embodiments wherever relevant.

DETAILED DESCRIPTION

The present invention is directed to a mounting system for mounting a panel instrument, such as a video monitor, to a mounting surface or support, such as a passenger seatback, dividing wall within a vehicle, or other structure. For instance, the mounting system may be used to mount a panel instrument to a passenger seatback or dividing wall in aircraft, trains, automobiles, buses, or other vehicles, as well as to any other suitable mounting surface/support. Although the embodiments described herein are directed to a mounting system for mounting a video monitor to a seatback, such as an aircraft passenger seatback, the present invention is not limited to such installations, but can be utilized on any type of vehicle, on any type of vehicle seat, on seatbacks not in a vehicle, or on any other suitable mounting surface.

Figure 1:
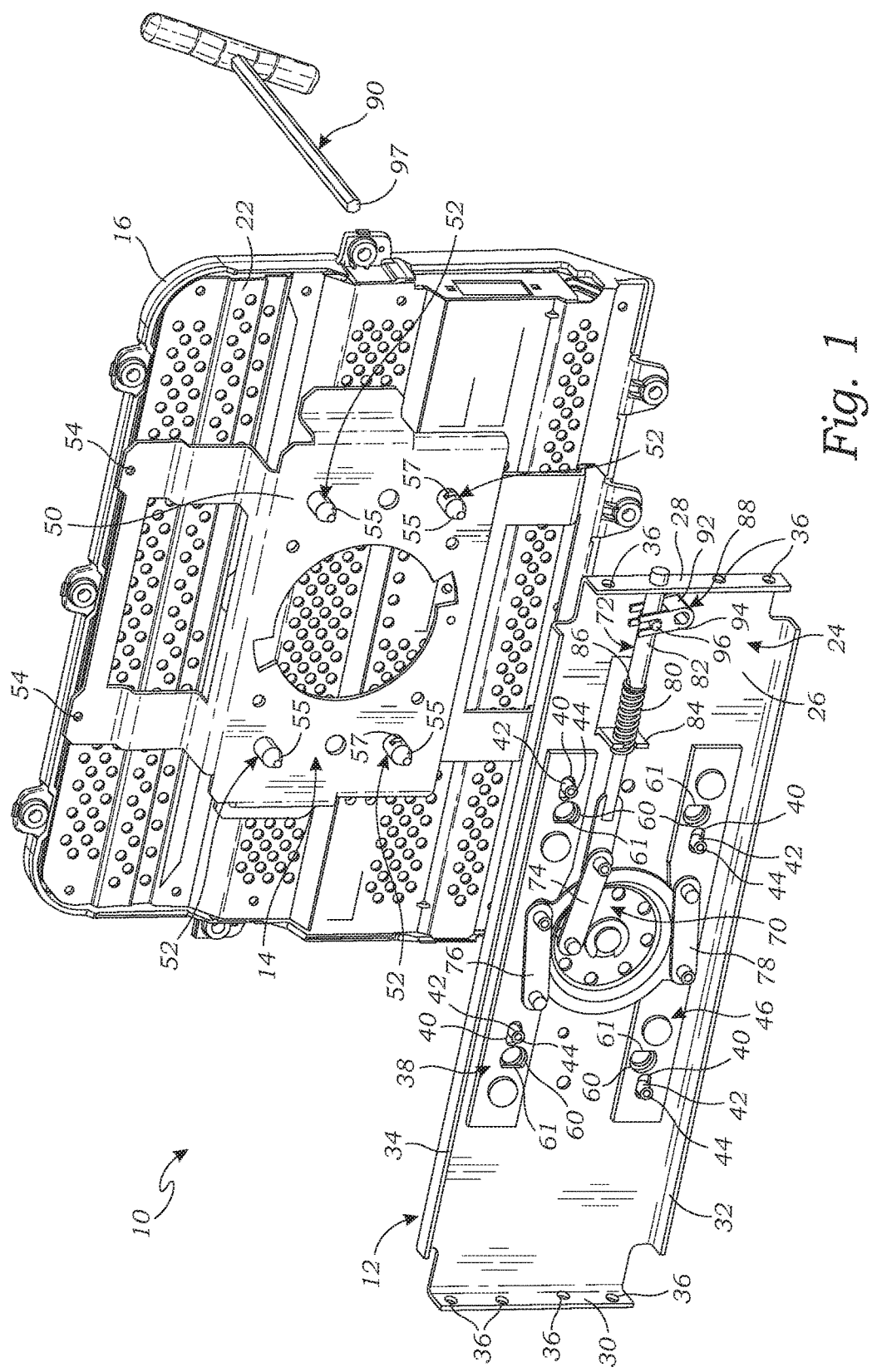
FIG. 1 is a rear perspective view of a mounting system being used for mounting a video monitor onto a mounting surface or support, with the first mounting apparatus uninstalled from the mating second mounting apparatus, according to one embodiment of the present invention.

Referring to FIG. 1, one embodiment of a mounting system 10 for mounting an instrument panel 18, in this case a video monitor 16, onto a mounting support 20, such as a recessed surface of a passenger seatback 11 (see FIGS. 3-4) is illustrated. In this described embodiment, the mounting system 10 comprises a first mounting apparatus 14 and a second mounting apparatus 12 in which the apparatuses 12 and 14 releasably mate to one another as described below. The second mating apparatus 12 is configured to be attached to a passenger seatback 11 (see FIG. 3), and the first mounting apparatus 14 is configured to be attached to a back surface 22 of the video monitor 16. Alternatively, the second mounting apparatus 14 may be configured to be attached to the passenger seatback 11, and the second mounting apparatus 12 may be configured to be attached to the back surface 22 of the video monitor 16.

The first mounting apparatus 14 comprises a frame 50 which is configured to be attached to the back surface 22 of the video monitor 16. The frame 50 has a plurality of mounting holes 54 for mounting the first mounting apparatus to the back surface 22. A plurality of mounting pins 52 are attached to the frame 50 and project rearward from the frame 50. Alternatively, the first mounting apparatus 14 may be integrated with the video monitor 16 such as by including the plurality of mounting pins 52 projecting from the back surface of the video monitor 16.

The second mounting apparatus 12 includes a main frame 24 comprising a substantially flat, rectangular plate 26 and flanges 28, 30, 32, and 34 extending rearward from edges of the plate 26. The flanges 28 and 30 have mounting holes 36 for attaching the frame to the mounting support 20 (see FIGS. 3 and 4).

A first slide bar 38 is slidably mounted to the frame 24. The first slide bar 38 comprises an elongated, flat bar which sits flat against the plate 26 of the frame 24. The first slide bar 38 is slidably mounted to the frame 24 using a pair of slots 40 in the first slide bar 38 in which each slot slidably receives a respective post 42 attached to the frame, such that the first slide bar 38 can translate back and forth as the slots 40 slide on the respective posts 42. A retainer 44, such as a fastener or ring, is attached to the end of each post 42 to secure the first slide bar 38 on the posts 42. The first slide bar 38 has a pair of spaced apart mounting holes 60 which are configured to receive a respective one of the mounting pins 52 when the first mounting apparatus 14 is mounted to the second mounting apparatus 12. The first slide bar 38 slides back and forth between a locked position in which the mounting holes 60 are positioned to lock the respective mounting pins 52 within the mounting holes 60 and thereby locking the second mounting apparatus 14 to the second mounting apparatus 12, and an unlocked position in which the mounting holes 60 are positioned to release the respective mounting pins 52 thereby releasing the first mounting apparatus 14 from the second mounting apparatus 12.

Each of the mounting pins 52 has a frusto-conical tip 55, or tapered tip, which provides an actuation surface for moving the first slide bar 38 from its locked position to its unlocked position. As the tip 55 of the mounting pin is inserted into its respective mounting hole 60, the tip 55 pushes against the edge of the mounting hole 60 and as the tip 55 moves further into the mounting hole 60 the widening tip moves the first slide bar 38 from the locked position to the unlocked position. Each of the mounting pins 52 also has a slot or locking groove 57 just below the tip 55. The locking groove 57 is configured to receive a locking edge of the mounting hole 60. In the embodiment shown in FIG. 1, the mounting holes 60 have a perimeter which is a circular arc and the locking edge 61 is a straight portion of the perimeter of the mounting holes connecting each end of the circular arc. The locking edge 61 has a thickness that is slightly smaller than the width of the locking groove 57 such that the locking edge 61 can slide into the locking groove 57. As described below, an actuator 72 exerts a biasing force on the first slide bar 38 which biases the first slide bar 38 toward the locked position. Thus, when a mounting pin 52 is inserted into a mounting hole 60, the tip 55 pushes the first slide bar 38 from the locked position toward the unlocked position. When the mounting pin 52 reaches a locking depth at which the locking groove 57 is aligned with the locking edge 61, the biasing force forces the first slide bar 38 toward the locked position thereby pushing the locking edge 61 into the locking groove 57, i.e., snaps or locks into place. In particular, the biasing force biases the locking edge 61 to remain within locking groove 57 thereby locking the mounting pin 52 in place within the mounting hole 60 such that the mounting pin 52 cannot be removed from the mounting hole 60 until the first slide bar 38 is moved to the unlocked position thereby removing the locking edge 61 from the locking groove 57.

A second slide bar 46 is slidably mounted to the frame 24, spaced apart from the first slide bar, in the same manner as the first slide bar 38. The second slide bar 46 is substantially the same as the first slide 38, and interfaces with two of the mounting pins 52 in the same manner as the first slide bar 38, as described herein. In the embodiment shown in FIG. 1, and described herein, the main difference between the first slide bar 46 and second slide bar 46 is that they move in opposite lateral directions for their respective locked position and unlocked position. In other words, the first slide bar 38 is moved to the right (as shown in the rear view of FIG. 1) for its locked position, while the second slide bar 46 is moved to the left for its locked position. Likewise, the first slide bar 38 is moved to the left for its unlocked position, while the second slide bar 46 is moved to the right for its unlocked position. This also requires that the locking edges 61 and locking grooves 57 associated with the respective first slide bar 38 and second slide bar 46 are located on opposite sides as between the first slide bar 38 and second slide bar 46.

An actuator assembly 70 is coupled to each of the first slide bar 38 and second slide bar, and is configured to slide the first slide bar 38 and second slide bar 46 between their respective locked positions and unlocked positions. The actuator assembly 70 is configured such that it simultaneously and synchronously moves both the first slide bar 38 and second slide bar 46 toward their respective unlocked positions, or toward their respective locked positions. Thus, when the actuator assembly 70 is actuated to its unlocking position, the actuator assembly 70 simultaneously moves both the first slide bar 38 and second slide bar 46 to their respective unlocked positions. Likewise, when the actuator assembly 70 is actuated to its locking position, the actuator assembly 70 simultaneously moves both the first slide bar 38 and second slide bar 46 to their respective locked positions. The actuator assembly 70 comprises a cam 71, an actuator 72, a linkage 74, a first link 76, and a second link 78.

The cam 71 is rotatably mounted to the frame 24 such that the cam 74 is rotatable relative to the frame 24. The cam 71 may be a coupling disc, as shown in FIG. 1, or a coupling rod, a coupling linkage, an alternatively shaped coupling plate, or other suitable device. The cam 71 is rotatable in a first rotational direction to a locking position (clockwise as shown in the rear view of FIG. 1), and an opposite, second rotational direction to an unlocking position (counter-clockwise as shown in the rear view of FIG. 1). The first link 76 couples the first slide bar 38 to the cam 71 such that rotation of the cam 71 in the first rotational direction (clockwise) moves the first slide bar 38 to the locked position (to the right), and rotation of the cam 71 in the second rotational direction (counter-clockwise) moves the first slide bar 38 to the unlocked position (to the left). Similarly, the second link 78 couples the second slide bar 46 to the cam 71 such that rotation of the cam 71 in the first rotational direction (clockwise) moves the second slide bar 46 to the locked position (to the left), and rotation of the cam 71 in the second rotational direction (counter-clockwise) moves the second slide bar 46 to the unlocked position (to the right).

The actuator 72 is disposed on the frame 24 and comprises a pull bar 82 slidably mounted to the frame 24. The pull bar 82 is coupled to the cam 71 using the linkage 78. The pull bar 82 moves laterally to rotate the cam 71, via the linkage 78, between the locking position and unlocking position. In the disclosed embodiment of FIG. 1, the pull bar 82 moves laterally to the right to rotate the cam 71 toward the locking position, and moves laterally to the left to rotate the cam 71 toward the unlocking position. The actuator 72 has a biasing device 80 coupled to the pull bar 82 (in this case, the spring is received on the pull bar 82), which may be a compression spring as shown in FIG. 1, or other suitable biasing device. A first end of the biasing device 80 bears against a spring stop 84 fixed to the frame 24, and a second end of the spring bears against a stop 86 on the pull bar 82 (e.g., an enlarged diameter of the pull bar 82, or a lock washer or spring washer fixed to the pull bar 82) such that the biasing device 80 biases the pull bar 82 to the right thereby biasing the cam 71 toward the locking position and both the first slide bar 38 and second slide bar 46 toward their locked positions. The actuator 72 also has a tool interface 88 for receiving a tool 90 for manually actuating the actuator 72 to move the pull bar 82 between the locking position and unlocking position. The tool interface 88 includes a shaft 92 rotatably coupled to the frame and extending from the front of the frame 24 through the frame 24 to the rear of the frame 24. A tool cam 94 is attached to a rear portion of the shaft 92 (portion on the rear side of the frame 24). The tool cam 94 has a pair of slotted ends which couple to respective pins 96 fixed to the pull bar 82 thereby coupling the tool interface 88 to the pull bar 82 such that rotation of the tool interface 88 moves the pull bar 82 between the locked position and the unlocked position. A front end of the shaft 92 (on the front side of the frame 24) has a tool connector 97 for receiving the tool 90. The tool connector 97 may have a special shape for receiving a custom tool 90, having a geometric shape different from standard tools and fasteners to prevent unauthorized tampering with the mounting system 10.

Figure 2:
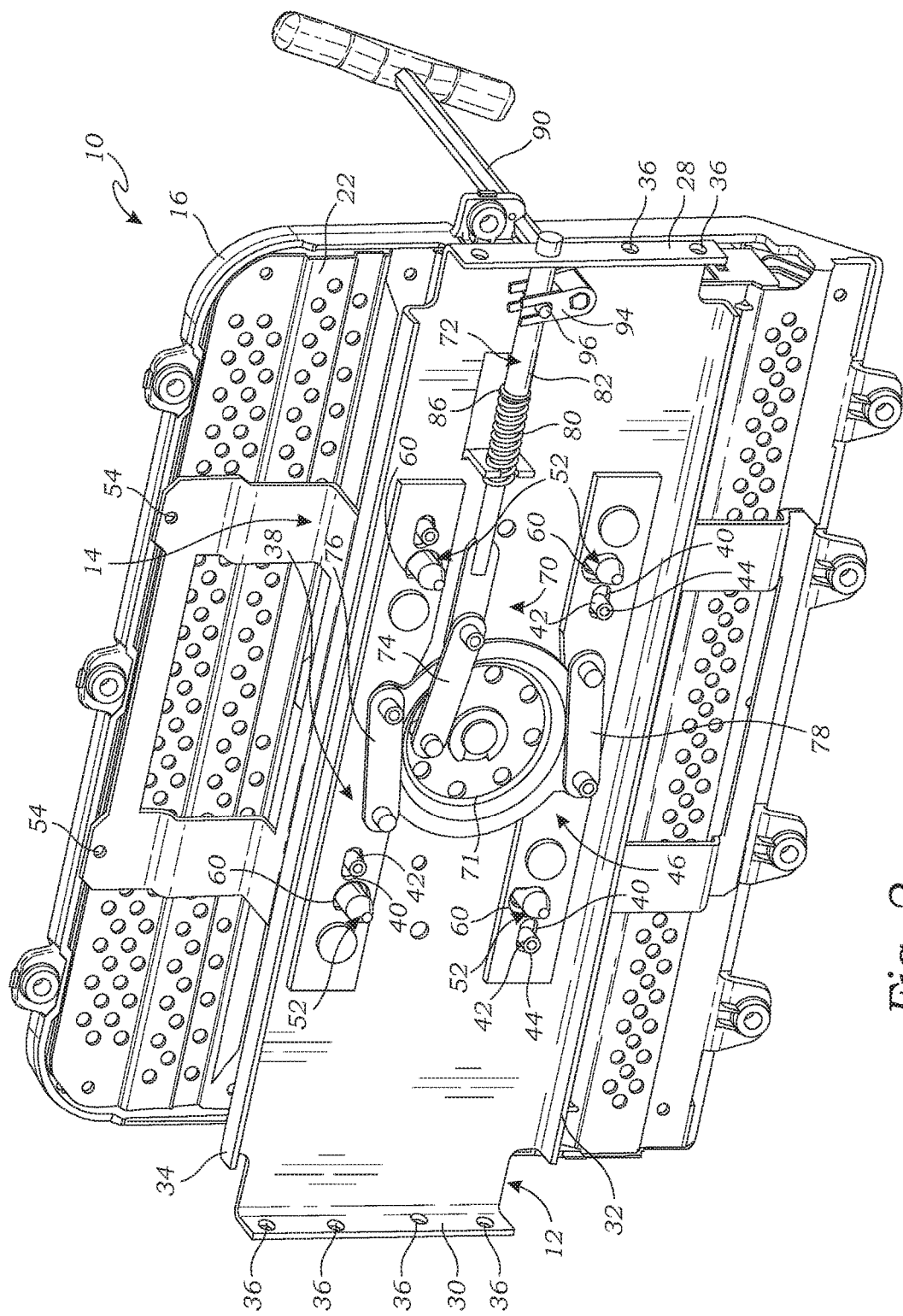
FIG. 2 is a rear, perspective view of the mounting system of FIG. 1, with the first mounting apparatus mounted to the mating second mounting apparatus, according to one embodiment of the present invention.
Figure 3:
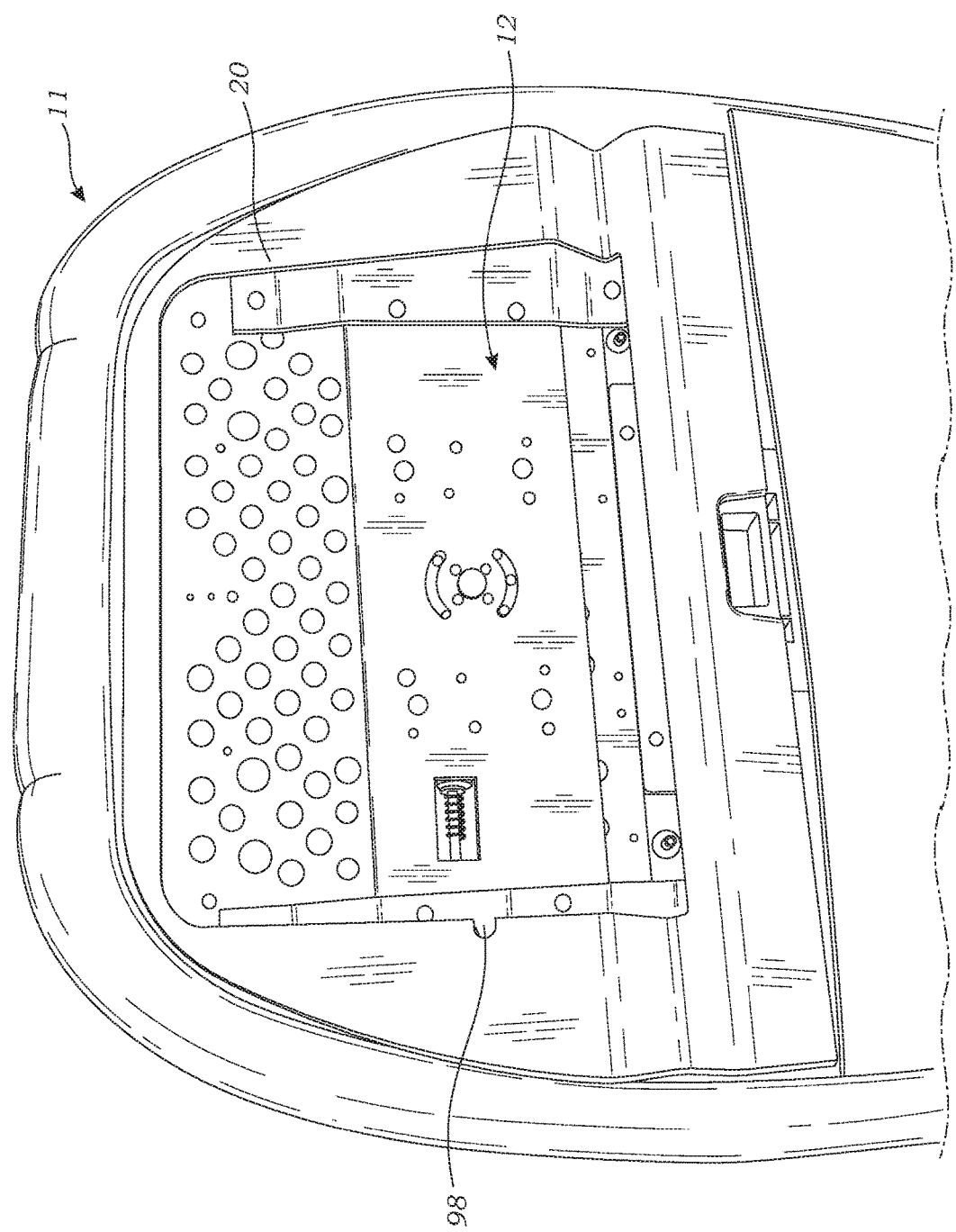
FIG. 3 is front, perspective view of the first mounting apparatus mounted to an aircraft passenger seatback, according to one embodiment of the present invention.
Figure 4:
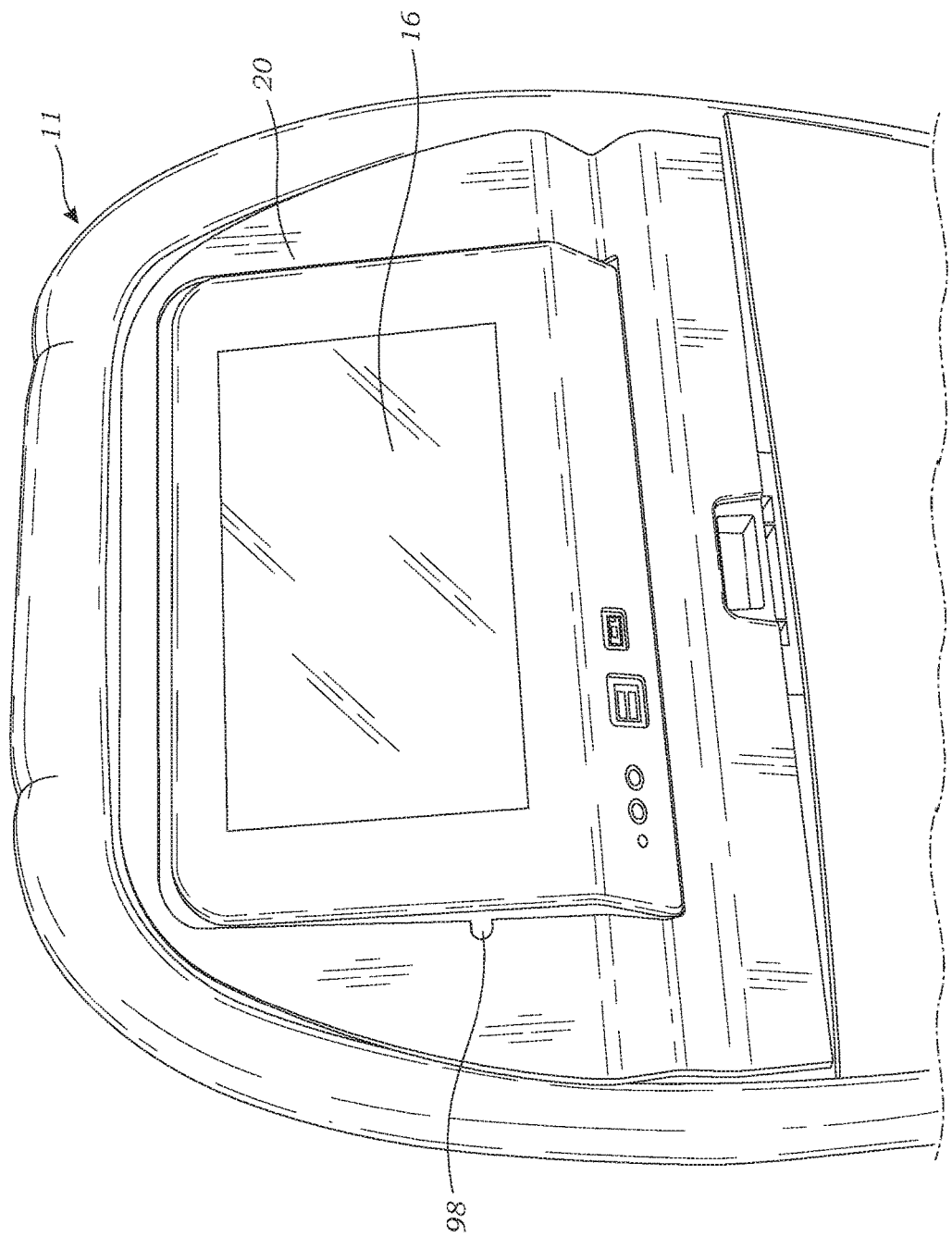
FIG. 4 is front, perspective view of a video monitor having the second mounting apparatus of the mounting system of FIG. 1 mounted to the first mounting apparatus mounted to an aircraft passenger seatback of FIG. 3, according to one embodiment of the present invention.

Referring to FIGS. 3 and 4, as well as FIGS. 1 and 2, the installation and operation of the mounting system 10 will now be described. First, the second mounting apparatus 12 is installed on the mounting support 20, in this case, the recessed surface 20 of a passenger seatback 11. This may be accomplished using screws inserted through the mounting holes 36 and screwing them into the mounting support 20. The first mounting apparatus 12 is attached to the back surface of the video monitor 16. As described herein, the first mounting apparatus 12 may be 14 may be integrated with the video monitor 16 such as by including the plurality of mounting pins 52 projecting from the back surface of the video monitor 16.

At this point, the biasing device 80 of the actuator 72 biases the cam 71 into the locking position which in turn biases the first slide bar 38 and second slide bar 46 into their respective locked positions.

In order to install the video monitor 16 to the mounting surface 20 using the mounting system 10, the first mounting apparatus 14 on the back surface 22 of the video monitor 16 is aligned with the mounting surface 20 such that each of the mounting pins 52 is aligned with a respective mounting hole 60. The first mounting apparatus 14 and video monitor 16 are then pressed toward the second mounting apparatus 12 such that the mounting pins 52 insert into the respective mounting holes 60. As the mounting pins 52 enter the mounting holes 60, the tip 55 of each mounting pin 52 pushes edge of the mounting hole 60, which pushes the first slide bar 38 and second slide bar 46 into the unlocked position such that the mounting pins 52 can be fully inserted into the mounting holes 60. When each mounting pin 52 reaches the locking depth within the mounting hole 60, the biasing device 80 biases the first slide bar 38 and second slide bar 46 back to the locking position as the locking edge 61 inserts into the locking groove 57. This position locks the mounting pins 52 within their respective mounting holes 60 such that they cannot be removed except by moving the first slide bar 38 and second slide bar 46 to their unlocked positions, thereby locking the first mounting apparatus 14 and video monitor 16 to the second mounting apparatus 12 and mounting support 20. Accordingly, the mounting system 10 allows the video monitor 16 to be mounted in the seatback 11 quickly and easily without using any tools. The video monitor 16 is now installed and locked to the mounting support 20 using the mounting system 10, as shown in FIG. 4. FIG. 3 shows the first mounting support 12 mounted to the second mounting support 14, without being attached to a mounting support 20 and video monitor 16, respectively.

As shown in FIGS. 3 and 4, the seatback 11 may have a cutout 98 or other opening aligned with the location of the tool connector 97 so that the tool 90 can be inserted through the cutout 98 and coupled to the tool connector 97 in order to actuate the actuator assembly 72.

To remove the first mounting apparatus 14 and video monitor 16 from the second mounting apparatus 12 and mounting support 20, the tool 90 is inserted through the cutout 98 and is coupled to the tool connector 97. The tool 90 is rotated to rotate the tool interface 88 (clockwise in the front views of FIGS. 3 and 4) which moves the pull bar 82 toward the unlocked position (i.e., to the left in the rear views of FIGS. 1 and 2). The movement of the pull bar 82 rotates the cam 71, via the linkage 74, in the second rotational direction (counter-clockwise in the rear views of FIGS. 1 and 2), which in turn pushes the first pull bar 38 to its unlocked position (to the left) and also pushes the second pull bar 46 to its unlocked position (to the right). The movement of the first pull bar 38 and second pull bar 46 to their unlocked positions moves each locking edge 61 out of the respective locking groove 57 such that the mounting pins 52 may be removed from their respective mounting holes 60. The first mounting apparatus 14 and video monitor 16 are then pulled outward away from the second mounting apparatus 12 and mounting support 20 such that the mounting pins 52 slide out and are removed from their respective mounting holes 60. The first mounting apparatus 14 and video monitor 16 are removed from the second mounting apparatus 12 and mounting support 20.

Although particular embodiments have been shown and described, it is to be understood that the above description is not intended to limit the scope of these embodiments. While embodiments and variations of the many aspects of the invention have been disclosed and described herein, such disclosure is provided for purposes of explanation and illustration only. Thus, various changes and modifications may be made without departing from the scope of the claims. For example, not all of the components described in the embodiments are necessary, and the invention may include any suitable combinations of the described components, and the general shapes and relative sizes of the components of the invention may be modified. While the mounting system 10 has been described for use with an LRU in the form of a video monitor 16, it could likewise be used for other types of LRUs for rapid attachment and detachment, such as seat electric boxes, floor distribution boxes, seat power modules, other types of LRUs. Accordingly, embodiments are intended to exemplify alternatives, modifications, and equivalents that may fall within the scope of the claims. The invention, therefore, should not be limited, except to the following claims, and their equivalents.

What is claimed is:

1. An apparatus for mounting a panel instrument to a mounting support, the panel instrument having a back surface with mounting pins projecting therefrom, the apparatus comprising:
    a frame configured to be mounted to the mounting support;
    a slide bar slidably mounted to the frame such that the slide bar is slidable between a locked position and an unlocked position, the slide bar having a mounting hole configured to receive one of said mounting pins projecting from the back surface of the panel instrument, the mounting hole configured to lock the one of said mounting pins within the mounting hole in the locked position and to allow the one of said mounting pins to be removed from the mounting hole in the unlocked position;
    a cam rotatably mounted to the frame such that the cam may be rotated relative to the frame in a first rotational direction to a locking position and a second rotational direction opposite the first rotational direction to an unlocking position;
    a link coupling the slide bar to the cam such that rotation of the cam in the first rotational direction forces the slide bar toward the locked position, and rotation of the cam in the second rotational direction forces the slide bar toward the unlocked position; and
    an actuator coupled to the cam and configured to rotate the cam between the locking position and the unlocking position, the actuator having a biasing device which biases the cam in the first rotational direction toward the locking position.

2. The apparatus of claim 1, wherein the actuator comprises a tool interface for receiving a tool for manipulating the actuator to rotate the cam.

3. The apparatus of claim 1, wherein the cam comprises a structure selected from the group consisting of a coupling disc, a coupling rod, a coupling link, and a coupling plate.

4. The apparatus of claim 1, wherein the actuator comprises:
    a pull bar slidably mounted to the frame;
    a linkage coupling the pull bar to the cam;
    the biasing device comprises a biasing spring received on the pull bar, a first end of the biasing spring bearing against a spring stop fixed to the frame and a second end of the biasing spring bearing against a stop on the pull bar such that the biasing spring biases the pull bar thereby causing the pull bar to exert a force on the linkage causing the linkage to bias the cam in the first rotational direction;
    a tool interface coupled to the pull bar, the tool interface configured to receive a tool for moving the pull bar which in turn moves the linkage causing the linkage to rotate the cam.

5. The apparatus of claim 1, wherein:
    the one of said mounting pins includes a groove, and the mounting hole comprises a locking edge configured to be received in the groove of the one of said mounting pins in the locked position of the slide bar such that when the one of said mounting pins is inserted into the mounting hole to a locking depth, the biasing of the biasing device forces the first locking edge into the groove and the biasing of the biasing device biases the locking edge to remain in the groove thereby locking the one of said mounting pins in place within the mounting hole such that the one of said mounting pins cannot be removed except by sliding the slide bar to the unlocked position.

6. The apparatus of claim 5, wherein the locking edge is further configured such that as the one of said mounting pins is inserted into the mounting hole, the one of said mounting pins pushes against the locking edge thereby pushing the slide bar toward the unlocked position.

7. The apparatus of claim 1, wherein:
    the slide bar comprises another mounting hole configured to receive another mounting pin projecting from the back surface of the panel instrument, the another mounting hole configured to lock the another mounting pin within the another mounting hole in the locked position of the slide bar and to allow the another mounting pin to be removed from the another mounting hole in the unlocked position of the slide bar.

8. The apparatus of claim 1, further comprising:
    another slide bar slidably mounted to the frame such that the another slide bar is slidable between a locked position and an unlocked position, the another slide bar having a another mounting hole configured to receive an another mounting pin projecting from the back surface of the panel instrument, the another mounting hole configured to lock the another mounting pin within the another mounting hole in the locked position and to allow the another mounting pin to be removed from the another mounting hole in the unlocked position; and
    an another link coupling the another slide bar to the cam such that rotation of the cam in the first rotational direction forces the another slide bar toward the locked position, and rotation of the cam in the second rotational direction forces the another slide bar toward the unlocked position.

9. The apparatus of claim 8, wherein the cam is positioned between the slide bars.

10. A mounting system for a panel instrument having a back surface, the system comprising:
    a first mounting apparatus including:
        a first frame configured to be mounted to the back surface of the panel instrument; and
        a mounting pin projecting from the first frame;
    a second mounting apparatus configured to releasably attach to the first mounting apparatus, the second mounting apparatus including:
        a second frame configured to be mounted to the mounting support;
        a slide bar slidably mounted to the second frame such that the slide bar is slidable between a locked position and an unlocked position, the slide bar having a mounting hole configured to receive the mounting pin, the mounting hole configured to lock the mounting pin within the mounting hole in the locked position and to allow the mounting pin to be removed from the mounting hole in the unlocked position;
        a cam rotatably mounted to the second frame such that the coupling member may be rotated relative to the frame in a first rotational direction to a locking position and a second rotational direction opposite the first rotational direction to an unlocking position;
        a link coupling the slide bar to the cam such that rotation of the cam in the first rotational direction drives the slide bar toward the locked position, and rotation of the cam in the second rotational direction drives the first slide bar toward the unlocked position; and an actuator coupled to the cam and configured to rotate the cam between the locking position and the unlocking position, the actuator having a biasing device which biases the cam in the first rotational direction toward the locking position.

11. The mounting system of claim 10, wherein the actuator includes:
a pull bar slidably mounted to the second frame;
a linkage coupling the pull bar to the cam; and
wherein the biasing device comprises a biasing spring received on the pull bar, a first end of the biasing spring bearing against a spring stop fixed to the second frame and a second end of the biasing spring bearing against a stop on the pull bar such that the biasing spring biases the pull bar thereby causing the pull bar to exert a force on the linkage causing the linkage to bias the cam in the first rotational direction;
a tool interface coupled to the pull bar, the tool interface configured to receive a tool for moving the pull bar which in turn moves the linkage causing the linkage to rotate the cam.

12. The mounting system of claim 10, wherein the cam comprises a structure selected from the group consisting of a coupling disc, a coupling rod, a coupling link, and a coupling plate.

13. The mounting system of claim 10, wherein:
the mounting pin includes a groove, and the mounting hole comprises a locking edge configured to be received in the groove of the mounting pin in the locked position of the slide bar such when the mounting pin is inserted into the mounting hole to a locking depth the biasing of the biasing device forces the first locking edge into the groove and the biasing of the biasing device biases the locking edge to remain in the groove thereby locking the mounting pin in place within the mounting hole such that it cannot be removed except by sliding the slide bar to the unlocked position.

14. The mounting system of claim 13, wherein the locking edge is further configured such that as the mounting pin is inserted into the mounting hole, the mounting pin pushes against the locking edge thereby pushing the mounting slide bar toward the unlocked position.

15. The mounting system of claim 10, wherein the first frame includes another mounting pin projecting therefrom, the another mounting apparatus further comprising:
an another slide bar slidably mounted to the second frame such that the another slide bar is slidable between a locked position and an unlocked position, the another slide bar having an another mounting hole configured to receive the another mounting pin projecting from the back surface of the panel instrument, the another mounting hole configured to lock another mounting pin within the another mounting hole in the locked position and to allow the another mounting pin to be removed from the another mounting hole in the unlocked position; and
an another link coupling the second slide bar to the cam such that rotation of the cam in the first rotational direction forces the second slide bar toward the locked position, and rotation of the cam in the second rotational direction forces the second slide bar toward the unlocked position.

16. An apparatus for mounting a panel instrument to a mounting support, the panel instrument having a back surface with mounting pins projecting therefrom, the apparatus comprising:

a frame configured to be mounted to the mounting support;
a slide bar slidably mounted to the frame such that the slide bar is slidable between a locked position and an unlocked position, the slide bar having a mounting hole configured to receive one of said mounting pins projecting from the back surface of the panel instrument, the mounting hole configured to lock the one of said mounting pins within the mounting hole in the locked position and to allow the one of said mounting pins to be removed from the mounting hole in the unlocked position; and
an actuator mounted to the frame, the actuator coupled to the slide bar and configured to slide the slide bar between the locked position and the unlocked position, the actuator having a biasing device which biases the slide bar toward the locked position;
wherein the one of said mounting pins includes a groove, and the mounting hole has a locking edge configured to be received in the groove of the one of said mounting pins in the locked position of the first slide bar such, when the one of said mounting pins is inserted into the mounting hole to a locking depth the biasing of the biasing device forces the locking edge into the groove and the biasing of the biasing device biases the first locking edge to remain in the groove thereby locking the one of said mounting pins in place within the mounting hole such that it cannot be removed except by sliding the slide bar to the unlocked position.

17. The apparatus of claim 16, wherein the locking edge is further configured such that as the one of said mounting pins is inserted into the mounting hole, the one of said mounting pins pushes against the locking edge thereby pushing the mounting slide bar toward the unlocked position.

18. The apparatus of claim 16, further comprising a linking assembly coupling the actuator to the slide bar such that actuation of the actuator forces the slide bar toward the locked position, and de-actuation of the actuator forces the slide bar toward the unlocked position.

19. The apparatus of 18, wherein the linking assembly comprises:
a cam rotatably mounted to the frame such that the cam may be rotated relative to the frame in a first rotational direction to a locking position and a second rotational direction opposite the first rotational direction to an unlocking position; and
a link coupling the cam to the slide bar such that rotation of the cam in the first rotational direction forces the slide bar toward the locked position, and rotation of the cam in the second rotational direction forces the slide bar toward the unlocked position;
wherein the cam is coupled to the actuator such that actuation of the actuator rotates the cam between the locking position and the unlocking position.

20. The apparatus of claim 16, wherein the actuator comprises:
a pull bar slidably mounted to the frame;
a cam rotatably mounted to the frame such that the cam may be rotated relative to the frame in a first rotational direction to a locking position and a second rotational direction opposite the first rotational direction to an unlocking position; and
a linkage coupling the pull bar to the cam;
wherein the biasing device comprises a biasing spring received on the pull bar, a first end of the biasing spring bearing against a spring stop fixed to the frame and a second end of the biasing spring bearing against a stop on the pull bar such that the biasing spring biases the pull bar in a first direction that exerts a force on the linkage causing the linkage to bias the cam in the first rotational direction.

* * * * *